United States Patent
Shah et al.

(10) Patent No.: US 10,279,775 B2
(45) Date of Patent: May 7, 2019

(54) UNAUTHORIZED ACCESS EVENT NOTIFICATION FOR VEHICLE ELECTRONIC CONTROL UNITS

(71) Applicant: Robert Bosch GmbH, Stuttgart (DE)

(72) Inventors: Ankit Shah, Canton, MI (US); Anthony Farrell, Clinton, MI (US); Karl Dresen, Sterling Heights, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/753,392

(22) PCT Filed: Aug. 18, 2016

(86) PCT No.: PCT/EP2016/069598
§ 371 (c)(1),
(2) Date: Feb. 19, 2018

(87) PCT Pub. No.: WO2017/042012
PCT Pub. Date: Mar. 16, 2017

(65) Prior Publication Data
US 2018/0244238 A1    Aug. 30, 2018

Related U.S. Application Data

(60) Provisional application No. 62/216,458, filed on Sep. 10, 2015.

(51) Int. Cl.
*B60R 25/10* (2013.01)
*H04L 29/06* (2006.01)
(Continued)

(52) U.S. Cl.
CPC .......... *B60R 25/10* (2013.01); *B60R 16/0231* (2013.01); *H04L 9/0825* (2013.01);
(Continued)

(58) Field of Classification Search
CPC ... H04L 63/10; H04L 63/1416; H04L 63/105; H04L 12/40005; H04L 63/1441;
(Continued)

(56) References Cited

U.S. PATENT DOCUMENTS 7,251,473 B2 * 7/2007 Alrabady ................ B60R 25/24
340/426.1
9,401,923 B2    7/2016 Valasek et al.
(Continued)

FOREIGN PATENT DOCUMENTS

DE    102008034150    1/2010
EP    2892199    7/2015
WO    2013093591 A1    6/2013

OTHER PUBLICATIONS

International Search Report and Written Opinion for Application No. PCT/EP2016/069598 dated Nov. 15, 2016, (11 pages).
(Continued)

*Primary Examiner* — Toan N Pham
(74) *Attorney, Agent, or Firm* — Michael Best & Friedrich LLP

(57) ABSTRACT

A private controller area network (CAN) is provided in a vehicle to notify non-targeted electronic control units (ECUs) of unauthorized attempts to access a target ECU. Each ECU on the private CAN stores a common encrypted hacking notification key (HNK) and a unique identification code. When a first vehicle system ECU detects an unauthorized access attempt via the public CAN, it sends a warning message to the other ECUs via the closed, private CAN.

6 Claims, 1 Drawing Sheet

(51) Int. Cl.
*H04L 12/40* (2006.01)
*B60R 16/023* (2006.01)
*H04L 9/08* (2006.01)
*H04L 29/08* (2006.01)

(52) U.S. Cl.
CPC ........ *H04L 12/40* (2013.01); *H04L 12/40045* (2013.01); *H04L 63/0876* (2013.01); *H04L 63/123* (2013.01); *H04L 63/1441* (2013.01); *H04L 67/12* (2013.01); *H04L 63/1408* (2013.01); *H04L 2012/40215* (2013.01); *H04L 2012/40273* (2013.01)

(58) Field of Classification Search
CPC ...... H04W 12/08; H04W 12/12; B60R 25/10; G07B 15/00
USPC ................................ 340/426.1, 5.8, 5.74, 5.3
See application file for complete search history.

(56) References Cited

U.S. PATENT DOCUMENTS 9,854,442 B2 * 12/2017 Mazzara, Jr. ......... H04W 12/08
10,009,325 B1 * 6/2018 David .................... H04L 12/40
2015/0020152 A1   1/2015 Litichever
2015/0113638 A1   4/2015 Valasek et al.
2015/0172306 A1   6/2015 Kim
2015/0270968 A1 * 9/2015 Nairn ...................... H04L 9/32
                                                                      713/181
2016/0197944 A1   7/2016 Allouche

OTHER PUBLICATIONS

Miller et al., "Remote Exploitation of an Unaltered Passenger Vehicle," Aug. 10, 2015 (91 pages).
Valasek et al., "Adventures in Automotive Networks and Control Units," IOActive, 2014, (99 pages).
Extended European Search Report for Application No. 16184645.6 dated Dec. 21, 2016 (8 pages).
Larson, Ulf E. et al., "An Approach to Specification-based Attack Detection for In-Vehicle Networks", 2008 IEEE Intelligent Vehicles Symposium, Jun. 4-6, 2008, pp. 220-225, Eindhoven University of Technology.
Hoppe, Tobias et al., "Security Threats to Automotive CAN Networks—Practical Examples and Selected Short-Term Countermeasures", Computer Safety, Reliability, and Security [Lecture notes on computer science], Sep. 22, 2008, pp. 235-248, Springer Berlin Heidelberg, Berlin.

* cited by examiner

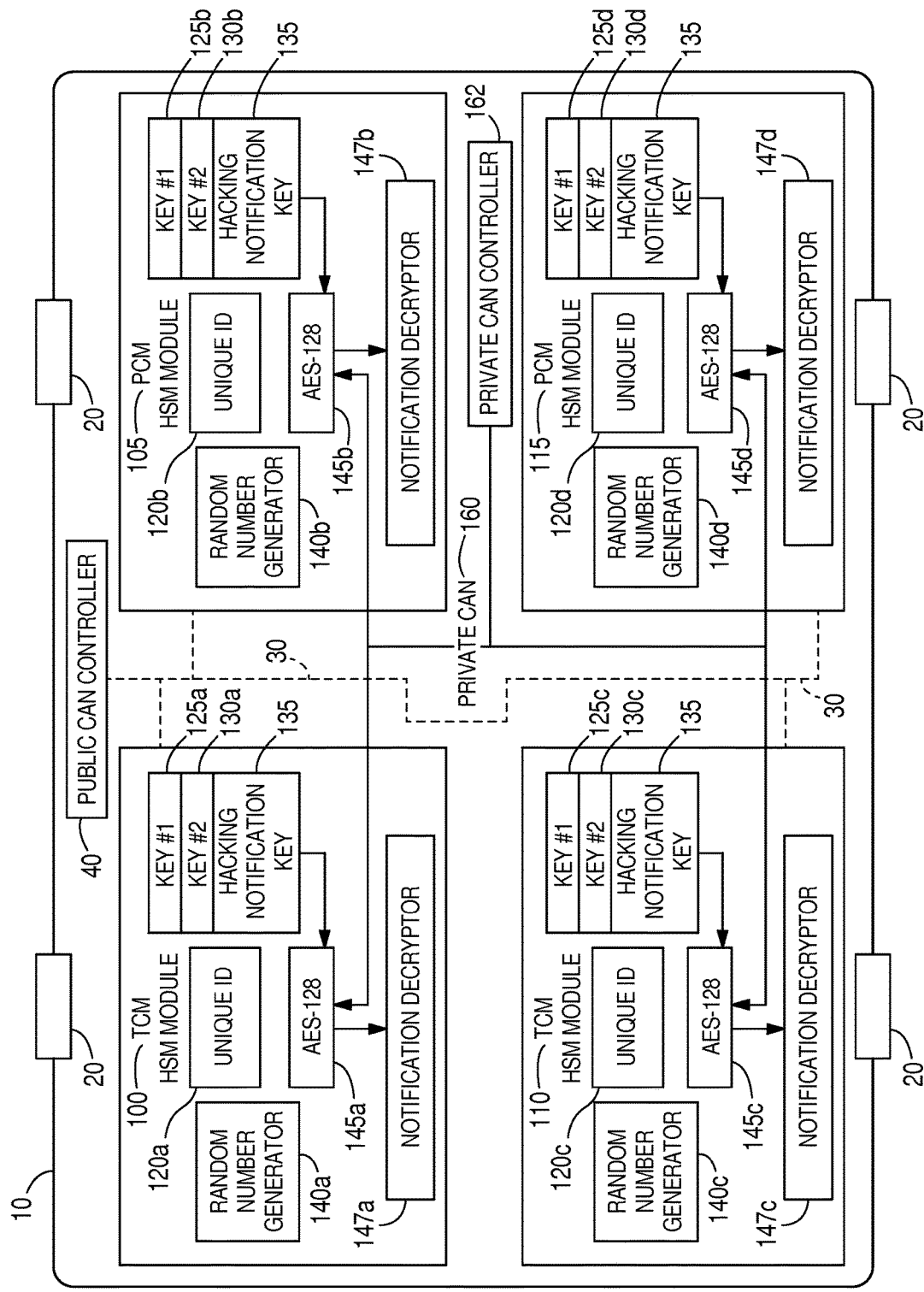

UNAUTHORIZED ACCESS EVENT NOTIFICATION FOR VEHICLE ELECTRONIC CONTROL UNITS

RELATED APPLICATIONS

This non-provisional application claims priority from U.S. provisional application Ser. No. 62/216,458 filed on Sep. 10, 2015, the entire contents of which are hereby incorporated by reference.

BACKGROUND

Embodiments of the invention relate to the field of vehicle security systems.

SUMMARY

It is possible for Electronic Control Units (ECUs) of vehicles to experience unauthorized access or tampering activities. Such unauthorized access could result in a loss of control of some vehicle systems, including critical systems like braking and steering. Particular ECUs may prevent the access but it would be useful to notify other ECUs of an unauthorized access or a tampering activity attempt. The invention allows an ECU to communicate with another ECU or other ECUs about an unauthorized access event.

In one embodiment, the invention provides a method of communicating an unauthorized access event to another ECU. This method includes communicating between ECUs with a private Controller Area Network (CAN) without a router or gateway. The private CAN networks at least the most critical active and passive safety modules, such as the steering system, braking systems and air bags. Communicating between the ECUs is utilized with event-based CAN messaging. The private CAN operates in addition to an already existing public CAN. The method also includes sharing an unauthorized access event key and a hacking notification key between the ECUs that is only used for a notification of an unauthorized access event.

Another embodiment provides a system configured to communicate an unauthorized access event to another ECU. The system includes ECUs, a private CAN, a hacking notification key, at least one processor, and at least one physical computer storage medium. The at least one physical computer storage medium includes stored executable instructions that, when executed by the at least one processor, cause the at least one processor to perform operations which communicate an unauthorized access event to another ECU on the private CAN. The operations include communicating between ECUs with a private Controller Area Network (CAN) without a router or gateway. Communication between the ECUs is utilized with event-based CAN messaging. The private CAN operates in addition to an already existing public CAN. The operations also include sharing an unauthorized access event key and a hacking notification key between the ECUs, the hacking notification key only being used for a notification of an unauthorized access event.

A method according to the invention includes at least one physical computer storage medium including stored instructions. The stored instructions, when executed, perform operations to communicate an unauthorized access event to another ECU on a private CAN. The operations include communicating between ECUs with a private Controller Area Network (CAN) without a router or gateway (i.e. in a peer-to-peer network). Communicating between the ECUs is utilized with event based CAN messaging. The private CAN operates in addition to an already existing public CAN. The operations also include sharing an unauthorized access event key and a hacking notification key between the ECUs, the hacking notification key only being used for a notification of an unauthorized access event.

BRIEF DESCRIPTION OF THE DRAWINGS

FIG. 1 is a diagram of a chassis system control according to some embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include standard processing components, such as one or more processors, one or more memory modules including non-transitory computer-readable medium, one or more input/output interfaces, and various connections (e.g., a system bus) connecting the components.

FIG. 1 is a diagram of a chassis system control or unauthorized access attempt notification system according to some embodiments of the invention. In addition, the vehicle 10 in FIG. 1 has a plurality of wheels 20. Vehicle 10 includes a public Controller Area Network 30 (hereinafter "public CAN") that interconnects or networks the electronic control units (ECUs) of the vehicle's electronically-controlled systems. Public CAN 30 can include a central controller 40 that controls traffic on public CAN 30. Instead of a physical bus for public CAN 30, a wireless encrypted network is used in some embodiments.

The system according to the invention includes a private CAN 160 that is in addition to public CAN 30. As discussed below, private CAN 160 is used to exchange messages between ECUs when a vehicular system has been attacked via public CAN 30 or otherwise.

In FIG. 1, private CAN 160 networks at least some of the vehicular electronic control units or modules such as a Transmission Control Module (TCM) 100, a Power Control Module (PCM) 105, a Driver Assistance System Module (DASM) 110, and an Electronic Stability Program (ESP) 115. Private CAN 160 uses a physical bus in some embodiments, or uses a wireless network in other embodiments. Each module includes a unique ID 120a, 120b, 120c and 120d respectively that is associated with the corresponding module and is used by other modules to identify the module from which messages originate. Each of modules 100, 105, 110 and 115 includes stored keys including but not limited to a Key no. 1 125a, 125b, 125c, and 125d respectively, a Key no. 2 130a, 130b, 130c, and 130d respectively, and a hacking notification key 135. The hacking notification key 135 is a unique common private key assigned for inter-ECU private communication. The HNK 135 resides in the non-volatile memory. By using this common dedicated key, the receiving ECU will be notified of a specific reason for the communication, which is an unauthorized access event and the source of the message which is the targeted ECU. This hacking notification key 135 is chosen by the Original Equipment Manager (OEM) and coordinated or stored in all participated ECU modules. A hacker may use a number of keys to attempt o obtain access to an ECU. The failed key stack can be stored with the targeted and non-targeted ECUs.

Each module 100, 105, 110 and 115 also includes a True Random Number Generator (TRNG) 140a, 140b, 140c and 140d respectively, and an AES-128 algorithm or other encryption engine 145a, 145b, 145c and 145d respectively. The AES-128 engine communicates with the corresponding notification decryptor 147a, 147b, 147c and 147d respectively which receive communication requests from external (e.g. test or diagnostic) modules.

All modules 100, 105, 110 and 115 communicate via public CAN 30, and the modules are also networked via private CAN 160. The private CAN 160 offers the unique advantage of secure access between ECUs without direct external influence because private CAN 160 is inaccessible from the outside the closed network. The private CAN cannot be accessed via an on-board diagnostic port (such as an OBDII port) or via a wireless signal. The private CAN 160 is a link between important active-passive safety modules without a gateway or a router (i.e. they are connected in a peer-to-peer network), in order to provide a more secure architecture against cyber-attacks and other unauthorized access events. Private CAN 160 is preferably comprised of physical electrical conductors or cables connected between the ECUs and the optional controller 162, although a robust encrypted wireless network can be used. Traffic on private CAN 160 is preferably encrypted for additional security.

For ECU boot up, software flash memory and runtime operation, software-hardware security features verify the authenticity of the access requester before providing access to the security system features such as the configuration of private CAN 160. If authentication fails, the requester is not permitted to access the security features.

If there is an access attempt on an ECU that is networked via the private CAN, such as the ESP module 115, then that module will ensure that the external module (e.g. an external tester or unauthorized unit) trying to gain access via the public CAN is authorized. In order to authorize the external module, the ESP module 115 has its random number generator 140d send a packet containing a random number to the external module via the public CAN. The external module encrypts the random number with a private key of a public-private key pair, and requests that the result be sent to the ESP module 115. The ESP module 115 then decrypts the received packet with its own public key using decryptor 147d to verify the authenticity of the external module. If the received message is successfully decrypted and the random numbers match, then the external module is authorized to use the public CAN, and no warning is sent out to notify other ECUs of the external module.

If the decryption is unsuccessful (i.e. either the private key and/or random number do not match the expected private key and random number), then the request from the external module was unauthorized. This unauthorized access event could be a hacking or tampering attempt. Event-based CAN message notifications are sent by the target module or controller 162 to the other ECUs on the private CAN 160 to notify them of the unauthorized access event attempt on one of the ECUs. A CAN message with a special unique identification code (ID) 120a, 120b, 120c or 120d (depending on the victim or source module) is generated from the victim ECU to other potentially targeted ECUs with a stored encrypted version of the common Hacking Notification Key. By means of a private CAN message, the victim ECU also encrypts and shares the encrypted, unauthorized access event key (the invalid key) in subsequent messages with the other ECUs on the private CAN network. All ECUs are notified simultaneously of the unauthorized request or first attack. In this way, the non-targeted ECUs are warned and alerted via private CAN 160 to watch for upcoming requests to their respective ECUs. An external module's unauthorized request via the public CAN 30 can then be limited to a particular ECU or ECUs, but is not spread from ECU to ECU via the public CAN or otherwise. This method allows the ECUs to learn from one another, which creates a more reliable and stable vehicle level cyber security system.

In some embodiments of the invention, the original equipment manufacturer ("OEM") provides vehicle level architecture guidelines for private CAN 160, event-based CAN unique IDs 120a, 120b, 120c and 120d for the exemplary modules 100, 105, 110 and 115 respectively, the common Hacking Notification Key 135, and notification methodology among private CAN networked ECUs. The suppliers of the various ECUs ensure that their respective Hardware Security Module (HSM) modules cooperate and meet OEM guidelines to fulfill the requirement to notify other ECUs about a potential intrusion in their ECU or ECUs. In other embodiments, a Security Hardware Extension (SHE) or a Trusted Platform Module (TPM) instead of a Hardware Security Module is used. The participating ECUs must also have a cyber-security hardware or software mechanism to perform encryption and decryption.

In some implementations, the above-described private CAN 160 is controlled using at least one processor or controller 162. Public CAN 30 can have one or more controllers 40. Each of controller 162 and controller 40 can include one or more processing units (e.g., a processor, application specific integrated circuits ("ASIC"), etc.), one or more memory modules including at least one non-transitory computer-readable medium, and one or more input/output interfaces. The controllers use the input/output interfaces to send and receive information with one or more sensors or systems external to the controllers (e.g., over a vehicle communication bus, such as a CAN bus or CAN wireless network). In some implementations, the controllers can also include one or more internal sensors or systems.

Various features and advantages of the invention are set forth in the following claims.

What is claimed is:

1. A method of securing vehicle electronic control units (ECUs), each ECU controlling a vehicle system and being connected to a public Controller Area Network (CAN) accessible from outside the vehicle, the method comprising:
    detecting an attempt to access a first ECU via the public CAN;
    determining when the attempt to access the first ECU is an unauthorized attempt; and
    transmitting a notification message to a second ECU of the unauthorized attempt using a private Controller Area Network (CAN);
    wherein the transmitting includes including an identification code in the notification message that uniquely identifies the first ECU;
    storing an encrypted hacking notification key (HNK) in the first ECU and in the second ECU, wherein the transmitting includes transmitting the encrypted HNK to the second ECU using the private CAN;
    encrypting an unauthorized access event key associated with the unauthorized access attempt; and
    wherein the transmitting includes transmitting the encrypted unauthorized access event key to the second ECU using the private CAN.

2. The method of claim 1, wherein the determining includes:
    generating a random number;
    transmitting the random number to a device making the access attempt using the public CAN;
    decrypting a response from the device; and
    comparing the decrypted response with a correct value to determine that the response is an authorized response.

3. A system for securing vehicle electronic control units (ECUs), each ECU controlling a vehicle system and being connected to a public Controller Area Network (CAN) accessible from outside the vehicle, the system comprising:
    a first ECU that controls a first vehicle system, including
        a first storage device that stores an encrypted hacking notification key;
    a second ECU that controls a second vehicle system;
        a second storage device that stores the encrypted hacking notification key; and
    a closed, private Controller Area Network (CAN) that interconnects the first ECU and the second ECU;
    wherein the first ECU is configured to transmit a warning message on the private CAN to the second ECU when the first ECU detects an unauthorized attempt to access the first ECU via the public CAN, wherein the transmitting carried out by the first ECU is adapted to include an identification code in the notification message that uniquely identifies the first ECU;
    wherein the first and the second ECU are adapted to store an encrypted hacking notification key (HNK), and wherein the first ECU is adapted to transmit the encrypted HNK to the second ECU using the private CAN; and
    wherein the first ECU is adapted to both encrypt an unauthorized access event key associated with the unauthorized access attempt and to transmit the encrypted unauthorized access event key to the second ECU using the private CAN.

4. The system of claim 3, wherein the first ECU further comprises:
    a random number generator that generates a random number to an external device that is attempting to obtain access to the first ECU on the public CAN.

5. The system of claim 4, wherein the first ECU further comprises:
    a decryption device that decrypts a message received from the external device.

6. The system of claim 3, wherein the first ECU further comprises:
    an encryption device configured to encrypt and decrypt messages sent and received by the first ECU.

* * * * *